US011527790B2

United States Patent
Hsieh et al.

(10) Patent No.: US 11,527,790 B2
(45) Date of Patent: Dec. 13, 2022

(54) CELL DEVICE AND VEHICLE (71) Applicant: Coretronic Intelligent Robotics Corporation, Hsin-Chu (TW)

(72) Inventors: Chi-Tong Hsieh, Hsinchu County (TW); Ying-Chieh Chen, Hsinchu County (TW); Hsu-Chih Cheng, Hsinchu County (TW); I-Ta Yang, Hsinchu County (TW)

(73) Assignee: Coretronic Intelligent Robotics Corporation, Hsin-Chu (TW)

( * ) Notice: Subject to any disclaimer, the term of this patent is extended or adjusted under 35 U.S.C. 154(b) by 245 days.

(21) Appl. No.: 16/820,718

(22) Filed: Mar. 17, 2020

(65) Prior Publication Data

US 2020/0313258 A1 Oct. 1, 2020

(30) Foreign Application Priority Data

Mar. 29, 2019 (CN) .......................... 201910248706.2

(51) Int. Cl.
*H01M 10/637* (2014.01)
*B60L 58/25* (2019.01)
(Continued)

(52) U.S. Cl.
CPC ........... *H01M 10/637* (2015.04); *B60L 50/64* (2019.02); *B60L 58/25* (2019.02); *B60L 58/26* (2019.02);
(Continued)

(58) Field of Classification Search
CPC ...... B60L 2200/10; B60L 50/64; B60L 58/25; B60L 58/26; B60L 58/27;
(Continued)

(56) References Cited

U.S. PATENT DOCUMENTS

| 2012/0009455 A1* | 1/2012 | Yoon ................. H01M 10/6555 429/120 |
| 2016/0226111 A1* | 8/2016 | Blume ................. H01M 10/613 |
| 2018/0354633 A1* | 12/2018 | Wang ..................... H02J 7/345 |

FOREIGN PATENT DOCUMENTS

| CN | 106410315 | 2/2017 |
| CN | 107403973 | 11/2017 |

(Continued)

OTHER PUBLICATIONS

"Office Action of China Counterpart Application", dated May 26, 2021, p. 1-p. 10.

(Continued)

*Primary Examiner* — Victoria H Lynch
(74) *Attorney, Agent, or Firm* — JCIPRNET (57) ABSTRACT

A cell device including a cell module and at least one temperature adjusting module is provided. The temperature adjusting modules are configured on the cell module in a heat conduction manner. Each of the temperature adjusting modules includes a thermoelectric cooling chip. The thermoelectric cooling chip has a first surface and a second surface opposite to each other. The thermoelectric cooling chip is configured to receive a first electric signal to heat the first surface and cool the second surface. The thermoelectric cooling chip is configured to receive a second electric signal to cool the first surface and heat the second surface. A vehicle including the cell device is also provided. The cell device of the disclosure is capable of implementing active temperature control and has good temperature control effect. The vehicle of the disclosure is capable of implementing active temperature control, and has a wider usage environment temperature.

20 Claims, 9 Drawing Sheets

(51) Int. Cl.
    *B60L 58/26*     (2019.01)
    *B60L 58/27*     (2019.01)
    *B64C 39/02*     (2006.01)
    *H01M 10/6572*     (2014.01)
    *H01M 10/653*     (2014.01)
    *H01M 10/625*     (2014.01)
    *H01M 10/613*     (2014.01)
    *H01M 10/052*     (2010.01)
    *B60L 50/64*     (2019.01)

(52) U.S. Cl.
    CPC ............ *B60L 58/27* (2019.02); *B64C 39/024* (2013.01); *H01M 10/052* (2013.01); *H01M 10/613* (2015.04); *H01M 10/625* (2015.04); *H01M 10/653* (2015.04); *H01M 10/6572* (2015.04); *B60L 2200/10* (2013.01); *B64C 2201/027* (2013.01); *B64C 2201/042* (2013.01); *H01M 2220/20* (2013.01)

(58) Field of Classification Search
    CPC ........ B64C 2201/027; B64C 2201/042; B64C 39/024; H01M 10/052; H01M 10/613; H01M 10/615; H01M 10/625; H01M 10/637; H01M 10/653; H01M 10/6572; H01M 2220/20; Y02E 60/10; Y02T 10/70
    See application file for complete search history.

(56) References Cited

FOREIGN PATENT DOCUMENTS

| | | |
|---|---|---|
| CN | 207265189 | 4/2018 |
| CN | 108365293 | 8/2018 |
| TW | 201622231 | 6/2016 |
| TW | M571078 | 12/2018 |

OTHER PUBLICATIONS

"Office Action of Taiwan Counterpart Application", dated Jun. 2, 2020, p. 1-p. 12.

* cited by examiner

CELL DEVICE AND VEHICLE

CROSS-REFERENCE TO RELATED APPLICATION

This application claims the priority benefit of China application serial no. 201910248706.2, filed on Mar. 29, 2019. The entirety of the above-mentioned patent application is hereby incorporated by reference herein and made a part of this specification.

BACKGROUND OF THE INVENTION

Field of the Invention

The disclosure relates to a cell device and a vehicle, and particularly relates to a cell device capable of implementing active temperature control and a vehicle using the cell device.

Description of Related Art

The use of lithium batteries in the market is limited by an ambient temperature. When the ambient temperature exceeds a predetermined value, in addition to a fast reaction rate causing expansion of a cell casing due to a high pressure, or even causing explosion, discharge efficiency of the cell is also decreased. Conversely, when the ambient temperature is lower than the predetermined value, the reaction rate is low, and energy output by the cell is also drastically lowered, and even cannot be output. At present, when the lithium cell is applied to an unmanned vehicle, a discharge protection mechanism is cancelled to avoid operation failure due to loss of a power supply, and damage to the cell caused by high temperature discharge of the cell is avoided by limiting a temperature of a usage environment and reducing a current load.

In brief, at present, all temperature control measures of cell cannot simultaneously solve the problems caused by environmental variables of the cell exceeding a predetermined temperature and lower than the predetermined temperature. Moreover, the unmanned vehicle in an environment exceeding the predetermined temperature can only be passively protected and cannot meet the need of active temperature control of the cell. Moreover, in the environment exceeding the predetermined temperature, the cell output efficiency is decreased, which may reduce a working time of the unmanned vehicle and affect mission performance thereof.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The disclosure is directed to a cell device, which is capable of implementing active temperature control, and has a good temperature control effect.

The disclosure is directed to a vehicle including the aforementioned cell device, which is capable of implementing active temperature control, and has wider usage environment temperature.

Other objects and advantages of the disclosure may be further illustrated by the technical features broadly embodied and described as follows.

In order to achieve one or a portion of or all of the objects or other objects, an embodiment of the disclosure provides a cell device including a cell module and at least one temperature adjusting module. The temperature adjusting module is configured on the cell module in a heat conduction manner. Each of the temperature adjusting modules includes a thermoelectric cooling chip. The thermoelectric cooling chip has a first surface and a second surface opposite to each other. The thermoelectric cooling chip is configured to receive a first electric signal to heat the first surface and cool the second surface. The thermoelectric cooling chip is configured to receive a second electric signal to cool the first surface and heat the second surface.

Another embodiment of the disclosure provides a vehicle including a body and a cell device. The cell device is fixed on the body, and the cell device includes a cell module and at least one temperature adjusting module. The temperature adjusting module is configured on the cell module in a heat conduction manner. Each of the temperature adjusting modules includes a thermoelectric cooling chip. The thermoelectric cooling chip has a first surface and a second surface opposite to each other. The thermoelectric cooling chip is configured to receive a first electric signal to heat the first surface and cool the second surface. The thermoelectric cooling chip is configured to receive a second electric signal to cool the first surface and heat the second surface.

Based on the above description, the embodiment of the disclosure has at least one of following advantages or effects. In the design of the cell device of the disclosure, the thermoelectric cooling chip of the temperature adjusting module may receive different electric signals to transform the first surface from a cool surface of the thermoelectric cooling chip to a warm surface of the thermoelectric cooling chip, or transform the first surface from the warm surface of the thermoelectric cooling chip to the cool surface of the thermoelectric cooling chip. In this way, the cell device of the disclosure may be charged and discharged under a relatively stable temperature environment, so as to increase a service life thereof. Moreover, the vehicle adopting the cell device of the disclosure may be used under all weather conditions.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
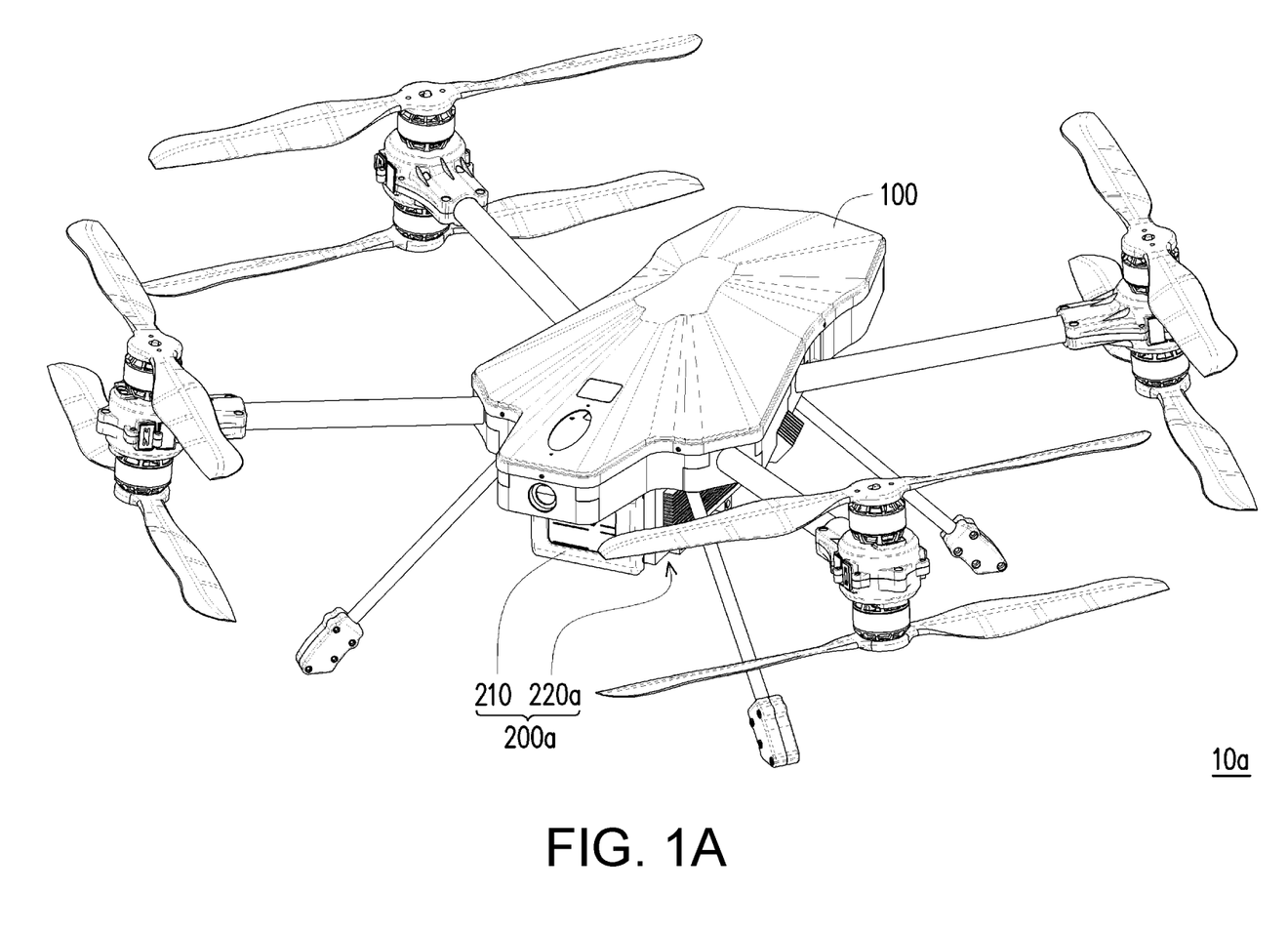
FIG. 1A is a three-dimensional view of a vehicle according to an embodiment of the invention.
Figure 1B:
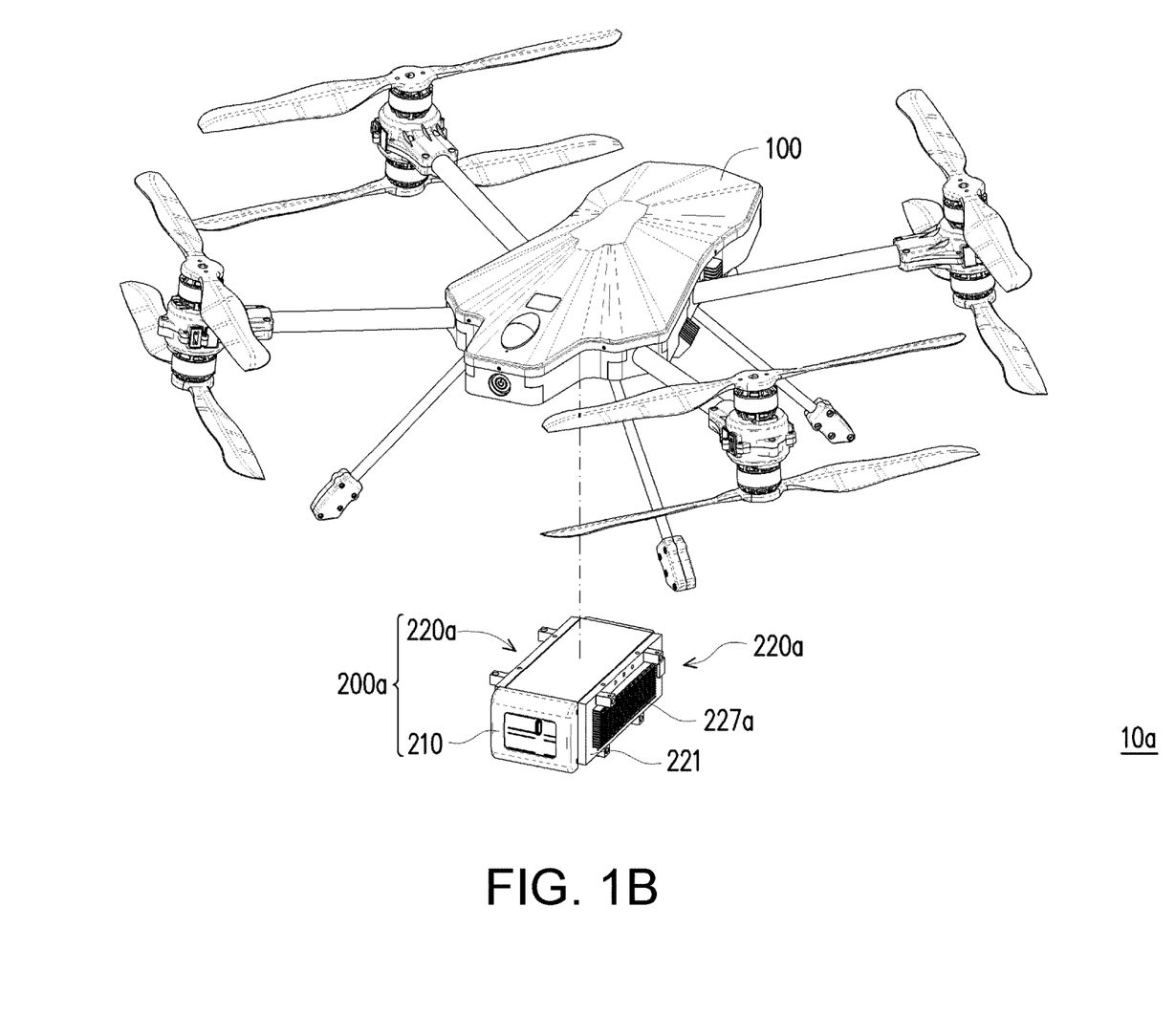
FIG. 1B is an exploded view of the vehicle of FIG. 1A.
Figure 1C:
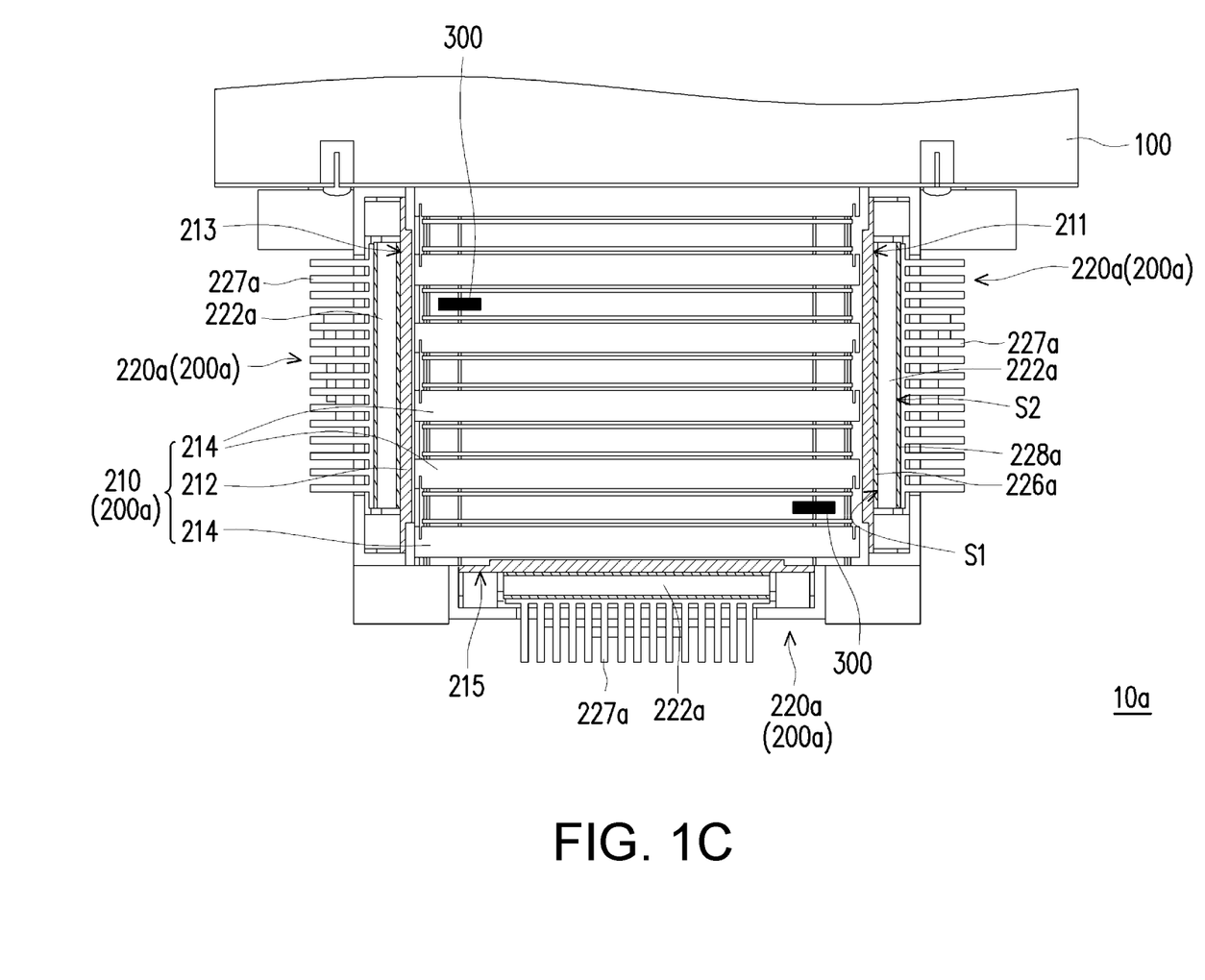
FIG. 1C is a partial cross-sectional view of the vehicle of FIG. 1A.
Figure 1D:
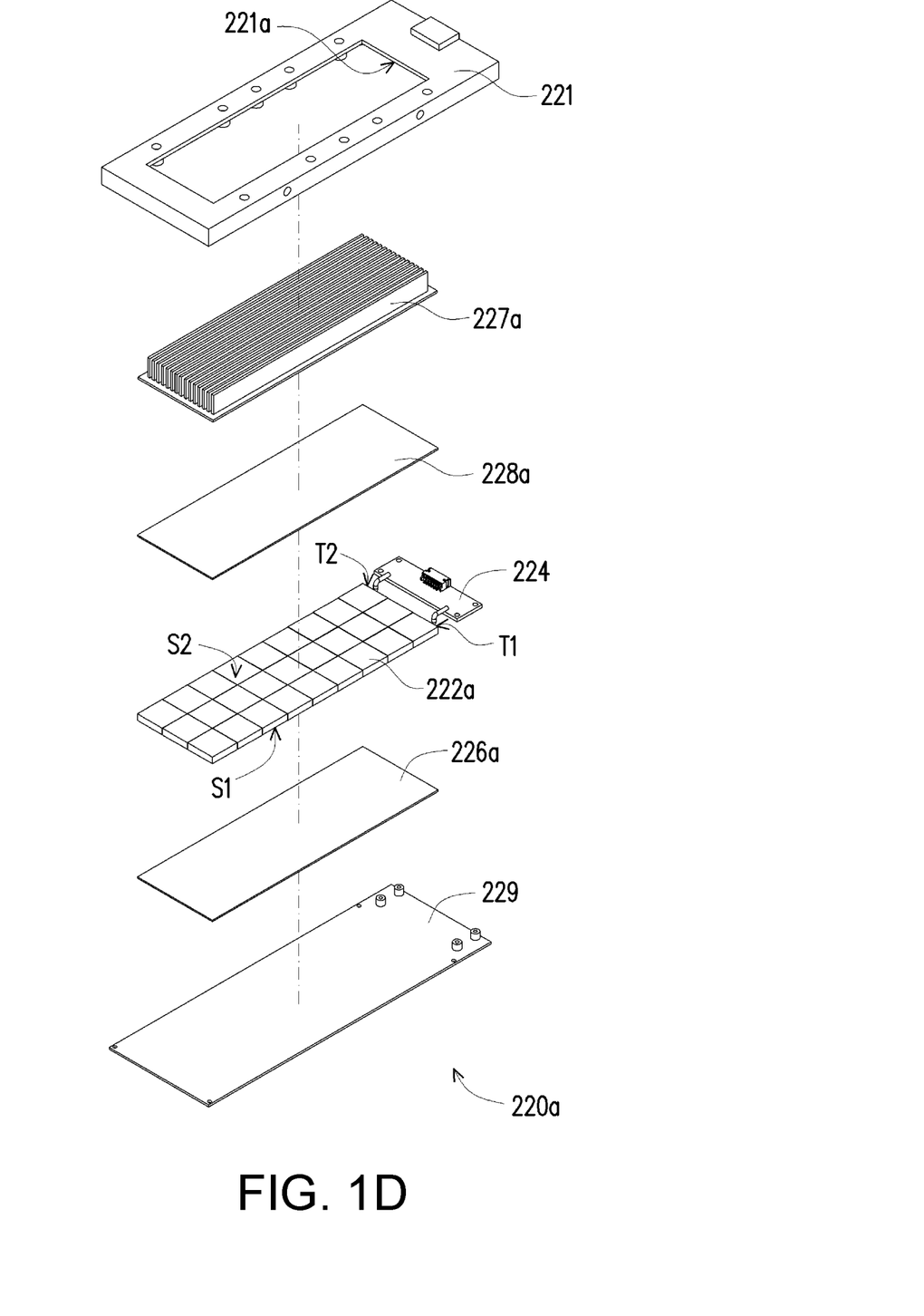
FIG. 1D is an exploded view of a temperature adjusting module of the vehicle of FIG. 1A.
Figure 1E:
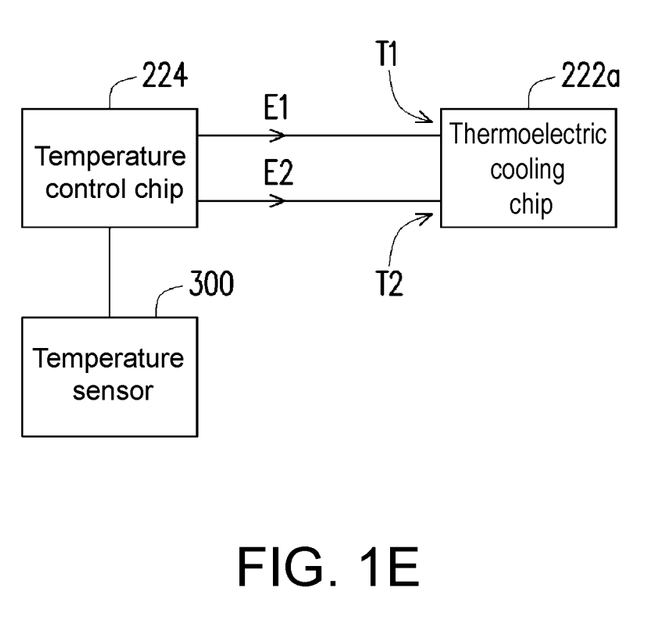
FIG. 1E is a schematic diagram of a part of components of the vehicle of FIG. 1A.

FIG. 1A is a three-dimensional view of a vehicle according to an embodiment of the invention. FIG. 1B is an exploded view of the vehicle of FIG. 1A. FIG. 1C is a partial cross-sectional view of the vehicle of FIG. 1A. FIG. 1D is an exploded view of a temperature adjusting module of the vehicle of FIG. 1A. FIG. 1E is a schematic diagram of a part of components of the vehicle of FIG. 1A.

Referring to FIG. 1A, FIG. 1B and FIG. 1C, the vehicle 10a of the embodiment includes a body 100 and a cell device 200a. The cell device 200a is fixed on the body 100, and the cell device 200a includes a cell module 210 and at least one temperature adjusting module (three temperature adjusting modules 220a are schematically illustrated in FIG. 1C). The temperature adjusting modules 220a are configured on the cell module 210 in a heat conduction manner, and each of the temperature adjusting modules 220a includes a thermoelectric cooling chip 222a. The thermoelectric cooling chip 222a has a first surface S1 and a second surface S2 opposite to each other. The thermoelectric cooling chip 222a is configured to receive a first electric signal to heat the first surface S1 and cool the second surface S2. The thermoelectric cooling chip 222a is configured to receive a second electric signal to cool the first surface S1 and heat the second surface S2.

For example, referring to FIG. 1E, when an electric signal E1 in FIG. 1E is a positive voltage and an electric signal E2 is a negative voltage, the electric signal E1 and the electric signal E2 construct the first electric signal, and the thermoelectric cooling chip 222a receives the positive voltage through a first input terminal T1 and receives the negative voltage through a second input terminal T2, so that the first electric signal is input to the thermoelectric cooling chip 222a to heat the first surface S1 and cool the second surface S2. Moreover, when the electric signal E1 is the negative voltage and the electric signal E2 is the positive voltage, the electric signal E1 and the electric signal E2 construct the second electric signal, and the thermoelectric cooling chip 222a receives the negative voltage through the first input terminal T1 and receives the positive voltage through the second input terminal T2, so that the second electric signal is input to the thermoelectric cooling chip 222a to cool the first surface S1 and heat the second surface S2. In the embodiment, the electric signals E1 and E2 are, for example, voltages, and in other embodiments, the electric signals E1 and E2 may also be currents, which is still within a protection scope of the invention.

In brief, by switching a polarity of the input signal, the first surface S1 may be transformed from a cool surface of the thermoelectric cooling chip 222a to a warm surface of the thermoelectric cooling chip 222a, or the first surface S1 may be transformed from the warm surface of the thermoelectric cooling chip 222a to the cool surface of the thermoelectric cooling chip 222a. In this way, the cell device 200a may be charged and discharged under a relatively stable temperature environment, so as to increase a service life of the cell device 200a, and the vehicle 10a adopting the cell device 200a may be used under all weather conditions.

Furthermore, the vehicle 10a of the embodiment is, for example, a flight vehicle, and the flight vehicle is, for example a multi-axis flight vehicle or an orientation flight vehicle. In other embodiments, the vehicle 10a may be a land vehicle or a robot, etc., where the land vehicle is, for example, a vehicle or an unmanned vehicle, but the invention is not limited thereto. Herein, the vehicle 10a implemented by a flight vehicle is taken as an example for description. In view of a structure, the cell module 210 and the temperature adjusting modules 220a of the cell device 200a may be fixed on the body 100 through a locking manner (such as by using a screw or a bolt). In view of an electrical connection, the temperature adjusting modules 220a of the cell device 200a is electrically connected to the body 100, and the cell module 210 may supply power to the temperature adjusting modules 220a. In view of signal transmission, the body 100 and the temperature adjusting modules 220a of the cell device 200a may adopt a wired transmission or wireless transmission, which is not limited by the invention.

To be specific, referring to FIG. 1C, FIG. 1D and FIG. 1E, the cell module 210 includes a casing 212 and a plurality of lithium batteries 214, where the lithium batteries 214 are located in the casing 212. The number of the lithium batteries 214 of the cell module 210 is preferably four at least. Moreover, in the embodiment, the number of the lithium batteries 214 is six. In addition, the temperature adjusting modules 220a are disposed on at least one side surface (three side surfaces 211, 213 and 215 are schematically illustrated) of the cell module 210, i.e. the temperature adjusting modules 220a of the embodiment are embodied by external temperature adjusting modules. Besides the thermoelectric cooling chip 222a, each of the temperature adjusting modules 220a further includes a temperature control chip 224, a first heat conduction pad 226a and a second heat conduction pad 228a. The temperature control chip 224 is electrically connected to the thermoelectric cooling chip 222a, and the first heat conduction pad 226a is disposed on the first surface S1 of the thermoelectric cooling chip 222a, and the second heat conduction pad 228a is disposed on the second surface S2 of the thermoelectric cooling chip 222a.

Moreover, in order to effectively protect the thermoelectric cooling chip 222a and the temperature control chip 224, each of the temperature adjusting modules 220a further includes an upper casing 221 and a lower casing 229. The lower casing 229 is assembled to the upper casing 221, where the temperature control chip 224, the thermoelectric cooling chip 222a, the first heat conduction pad 226a and the second heat conduction pad 228a are located between the upper casing 221 and the lower casing 229. Moreover, in order to effectively improve heat dissipation efficiency, each of the temperature adjusting modules 220a further includes a cooling fin 227a disposed on the upper casing 221. For example, the upper casing 221 may have an opening 221a, where the cooling fin 227a may penetrate through the opening 221a to stretch out of the upper casing 221, but the invention is not limited thereto. In another embodiment that is not illustrated, the upper casing and the cooling fin may also be an integral structure. Since each of the temperature adjusting modules 220a of the embodiment has the design of the cooling fin 227a, when the vehicle 10a flies, the warm surface may be cooled by an external airflow, so as to save power to increase the whole efficiency of the temperature adjusting modules 220a.

Referring to FIG. 1C, the thermoelectric cooling chip 222a of the embodiment is located between the cell module 210 and the cooling fin 227a, and the first surface S1 of the thermoelectric cooling chip 222a is located between the cell module 210 and the second surface S2. In order to accurately get to learn a temperature of the cell module 210, the vehicle 10a of the embodiment further includes at least one temperature sensor 300, where the temperature sensor 300 is disposed in the cell module 210. For example, the temperature sensor 300 is located between two lithium batteries 214 for sensing the temperature of the cell module 210. In the embodiment, two temperature sensors 300 are illustrated in FIG. 1C, but the number of the temperature sensors 300 is not limited thereto, and a proper number of the temperature sensors 300 may be used based on factors such as a size of the cell module 210, a distance between two lithium batteries 214, etc.

When the temperature of the cell module 210 sensed by the temperature sensors 300 is lower than a first temperature value, the thermoelectric cooling chip 222a receives the first electric signal to heat the first surface S1 and cool the second surface S2. When the temperature of the cell module 210 sensed by the temperature sensors 300 is higher than a second temperature value, the thermoelectric cooling chip 222a receives the second electric signal to cool the first surface S1 and heat the second surface S2. Herein, the first temperature value is smaller than the second temperature value. It should be noted that a temperature difference of the first surface S1 and the second surface S2 of the thermoelectric cooling chip 222a is between 20° C. and 70° C., which is determined by a cooling effect of the warm surface. In view of a usage efficiency, to input 30 watts of electricity may carry away 3 watts to 9 watts of heat, which has an efficiency of about 10% to 30%.

In brief, in the design of the vehicle 10a of the embodiment, each of the temperature adjusting modules 220a of the cell device 200a has the thermoelectric cooling chip 222a, so that when the temperature sensed by the temperature sensors 300 is higher than or lower than a predetermined value, the thermoelectric cooling chip 222a may receive different electric signals to activate a cooling and heating effect, so as to adjust the temperature of the cell module 210. In this way, the cell device 200a of the embodiment may have an active temperature control function, so that the cell device 200a may be charged and discharged under a relatively stable temperature environment, so as to increase a service life thereof. Moreover, the temperature adjusting modules 220a of the embodiment are disposed on the side surfaces 211, 213 and 215 of the cell module 210 in an external hanging manner, which have advantages of simple structure, lightweight and high stability, and the thermoelectric cooling chip 222a thereof has high-precision and high-reaction control, and may achieve high cooling efficiency and precise temperature control through a simple direct current power supply. Moreover, the vehicle 10a adopting the cell device 200a of the embodiment may greatly increase an environment temperature range of use, and may be used under all weather conditions.

It should be noted that reference numbers of the components and a part of contents of the aforementioned embodiment are also used in the following embodiment, wherein the same reference numbers denote the same or like components, and descriptions of the same technical contents are omitted. The aforementioned embodiment may be referred for descriptions of the omitted parts, and detailed descriptions thereof are not repeated in the following embodiment.

Figure 2:
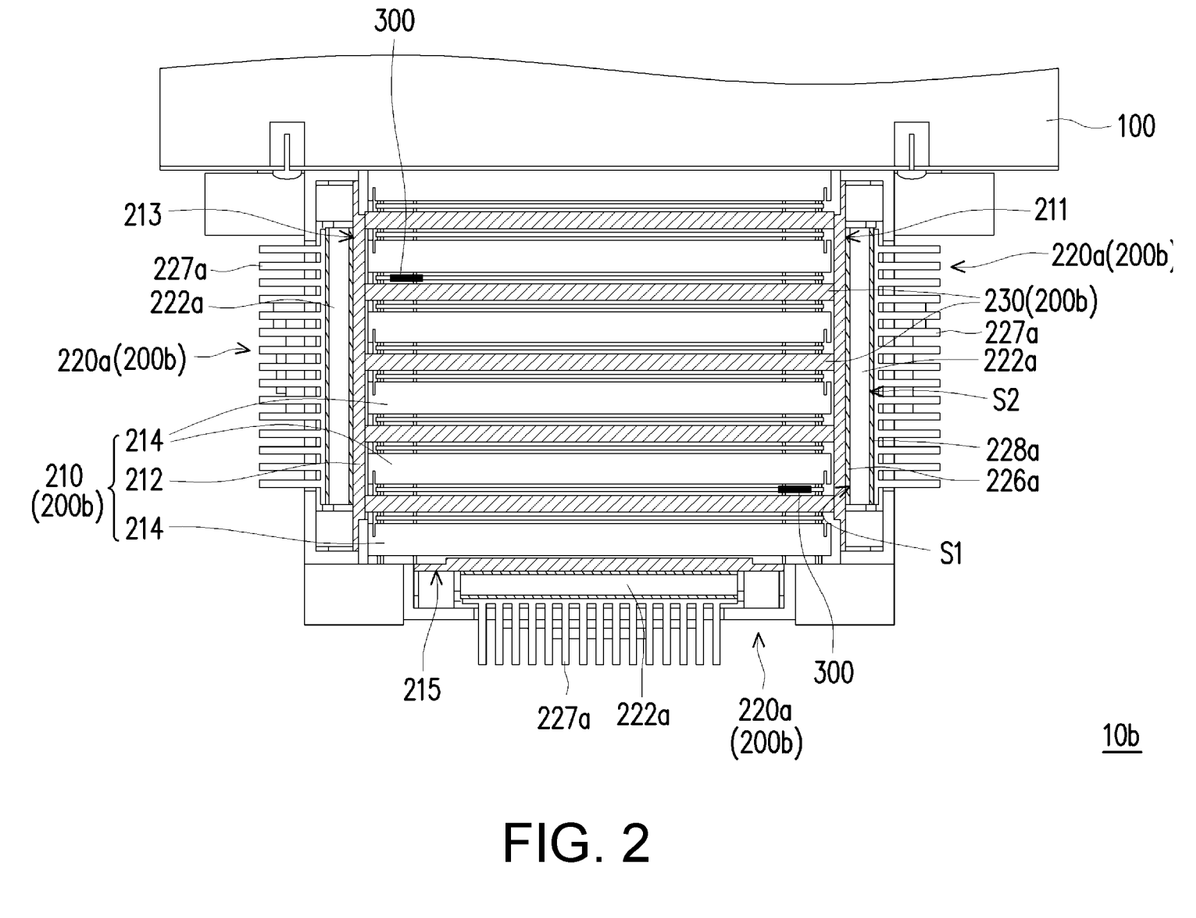
FIG. 2 is a partial cross-sectional view of a vehicle according to another embodiment of the invention.

FIG. 2 is a partial cross-sectional view of a vehicle according to another embodiment of the invention. Referring to FIG. 1C and FIG. 2, the vehicle 10b of the embodiment is similar to the vehicle 10a of FIG. 1C, and a difference there between is that the cell device 200b of the embodiment further includes at least one heat conduction sheet 230, where the heat conduction sheet 230 is disposed in the casing 212 of the cell module 210 and located between the lithium batteries 214 for conducting the heat in the cell module 210 to the temperature adjusting modules 220a. The heat conduction sheet 230 and the casing 212 may be formed integrally, but the invention is not limited thereto. Moreover, in the embodiment, the temperature sensors 300 are disposed in the cell module 210. For example, the temperature sensors 300 are located between the lithium cell 214 and the heat conduction sheet 230. Furthermore, two sides of the heat conduction sheet 230 may be configured with heat conduction pads (not shown), so that the temperature sensors 300 may be located between the lithium cell 214 and the heat conduction pad.

Figure 3A:
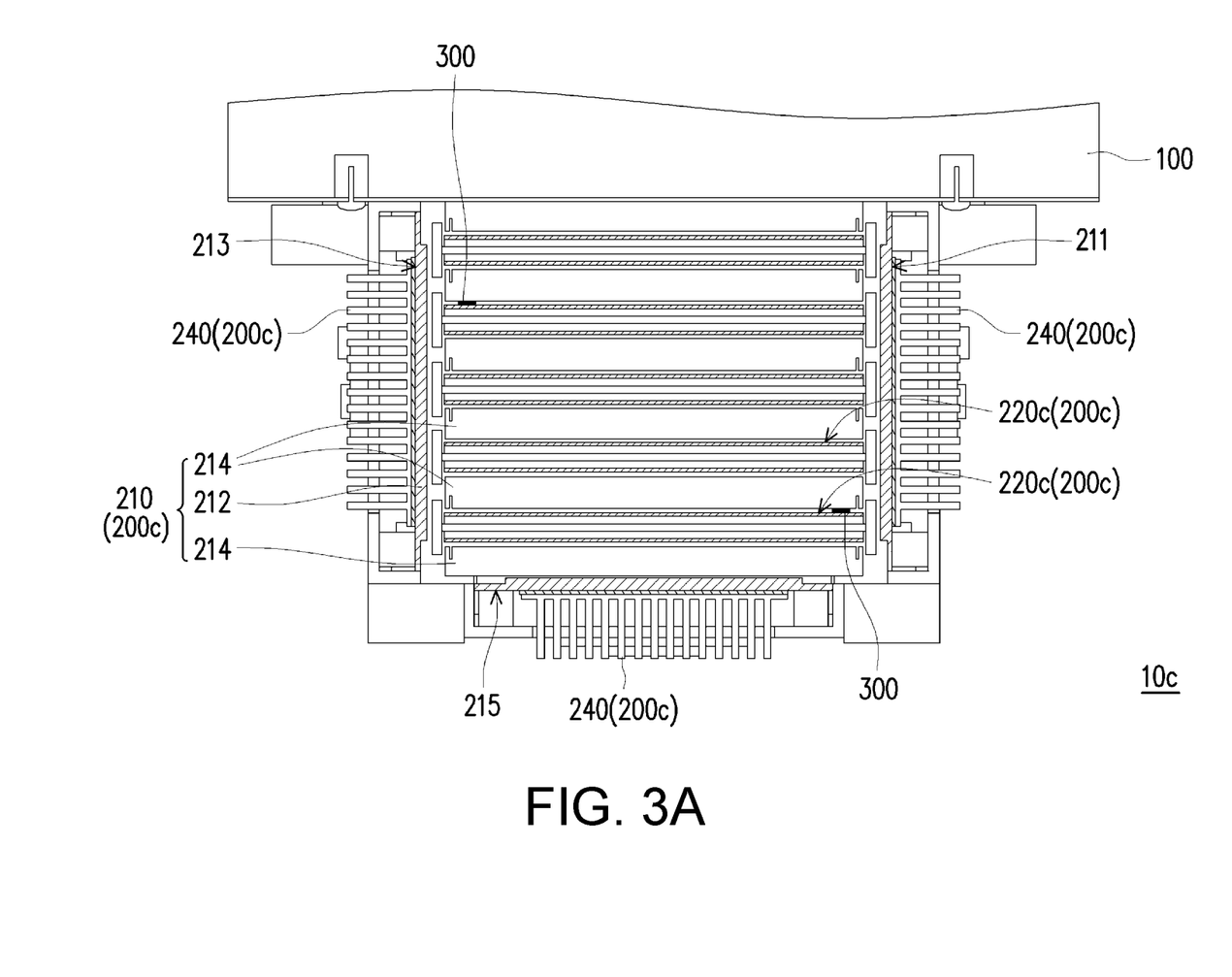
FIG. 3A is a partial cross-sectional view of a vehicle according to another embodiment of the invention.
Figure 3B:
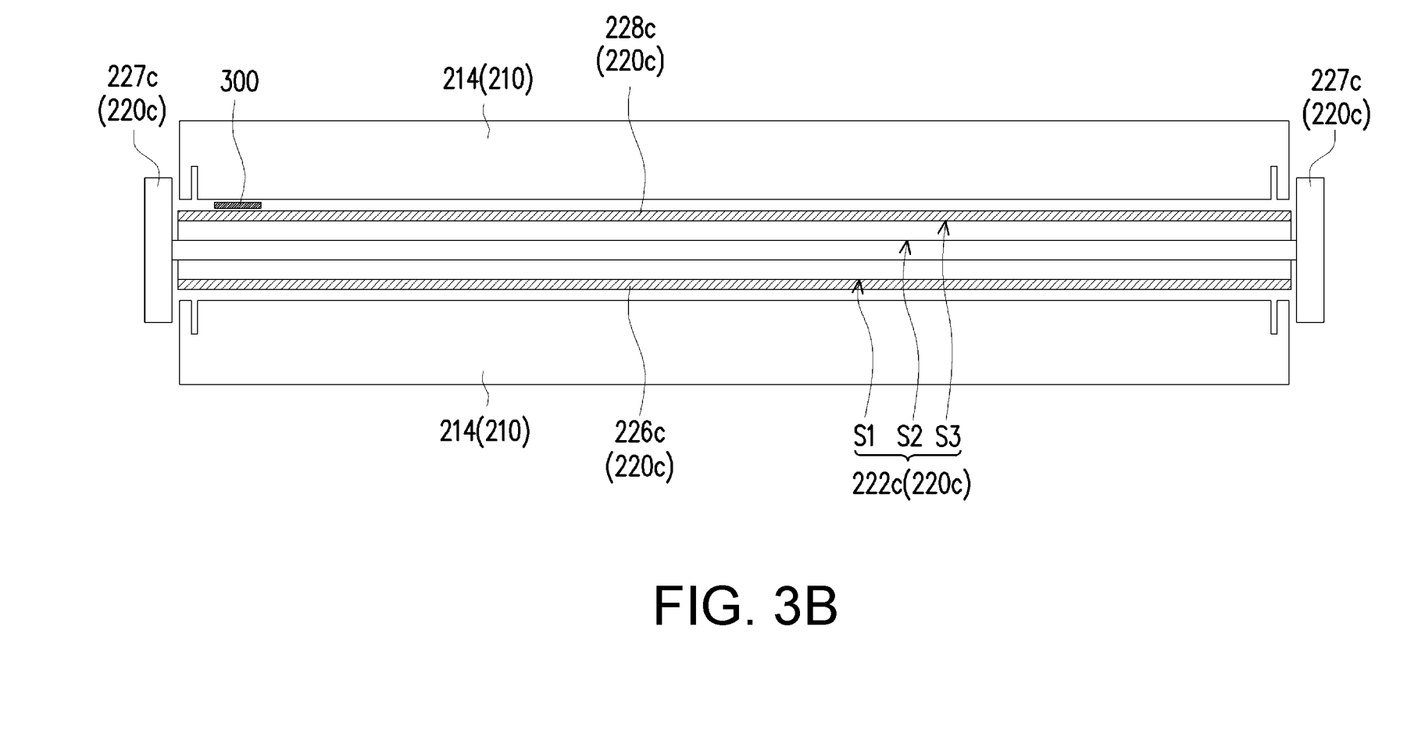
FIG. 3B is a partial enlarged cross-sectional view of a cell device of the vehicle of FIG. 3A.

FIG. 3A is a partial cross-sectional view of a vehicle according to another embodiment of the invention. FIG. 3B is a partial enlarged cross-sectional view of a cell device of the vehicle of FIG. 3A. Referring to FIG. 1C and FIG. 3A, the vehicle 10c of the embodiment is similar to the vehicle 10a of FIG. 1C, and a difference there between is that the temperature adjusting module 220c of the cell device 200c of the embodiment includes a thermoelectric cooling chip 222c, a temperature control chip 224 (referring to FIG. 1E), a first heat conduction pad 226c, a cooling fin 227c and a second heat conduction pad 228c, where the thermoelectric cooling chip 222c is located between the lithium batteries 214 of the cell module 210. Namely, the temperature adjusting modules 220c of the embodiment are embodied by embedded temperature adjusting modules. Moreover, in the embodiment, the temperature sensors 300 are disposed in the cell module 210, for example, the temperature sensors 300 are located between the lithium cell 214 and the first heat conduction pad 226c, or the temperature sensors 300 are located between the lithium cell 214 and the second heat conduction pad 228c, as shown in FIG. 3B.

In detail, referring to FIG. 1E, FIG. 3A and FIG. 3B, the thermoelectric cooling chip 222c of the embodiment has a third surface S3, where the second surface S2 is located between the first surface S1 and the third surface S3, and the cooling fin 227c is connected to two opposite sides of the second surface S2. To be specific, the first surface S1 of the thermoelectric cooling chip 222c is located between a lithium cell 214 of the cell module 210 and the second surface S2, and the third surface S3 is located between another lithium cell 214 of the cell module 210 and the second surface S2. Herein, an extending direction of the cooling fin 227c is perpendicular to an extending direction of the thermoelectric cooling chip 222c. Moreover, the cell device 200c of the embodiment further includes at least one cooling fin (three cooling fins 240 are schematically illustrated in FIG. 3A), where the cooling fins 240 are disposed on the side surfaces 211, 213 and 215 of the cell module 210.

When the temperature of the cell module 210 sensed by the temperature sensors 300 is lower than the first temperature value, the thermoelectric cooling chip 222c receives the first electric signal to heat the first surface S1 and the third surface S3 and cool the second surface S2. When the temperature of the cell module 210 sensed by the temperature sensors 300 is higher than the second temperature value, the thermoelectric cooling chip 222a receives the second electric signal to cool the first surface S1 and the third surface S3 and heat the second surface S2. Herein, the first temperature value is smaller than the second temperature value. Namely, when the temperature of the cell module 210 is lower than the predetermined value, the thermoelectric cooling chip 222c receives the first electric signal to heat the first surface S1 and the third surface S3 to present the warm surfaces and cool the second surface S2 to present the cool surface, so as to heat the lithium cell 214 located adjacent to the first surface S1 and the lithium cell 214 located adjacent to the third surface S3, and accordingly increase a whole temperature of the cell module 210. On the other hand, when the temperature of the cell module 210 is higher than the predetermined value, the thermoelectric cooling chip 222c receives the second electric signal to cool the first surface S1 and the third surface S3 to present the cool surfaces and heat the second surface S2 to present the warm surface, so as to cool the lithium cell 214 located adjacent to the first surface S1 and the lithium cell 214 located adjacent to the third surface S3, and accordingly decrease the whole temperature of the cell module 210, and the cell module 210 is cooled through the cooling fins 227c and 240.

Figure 4:
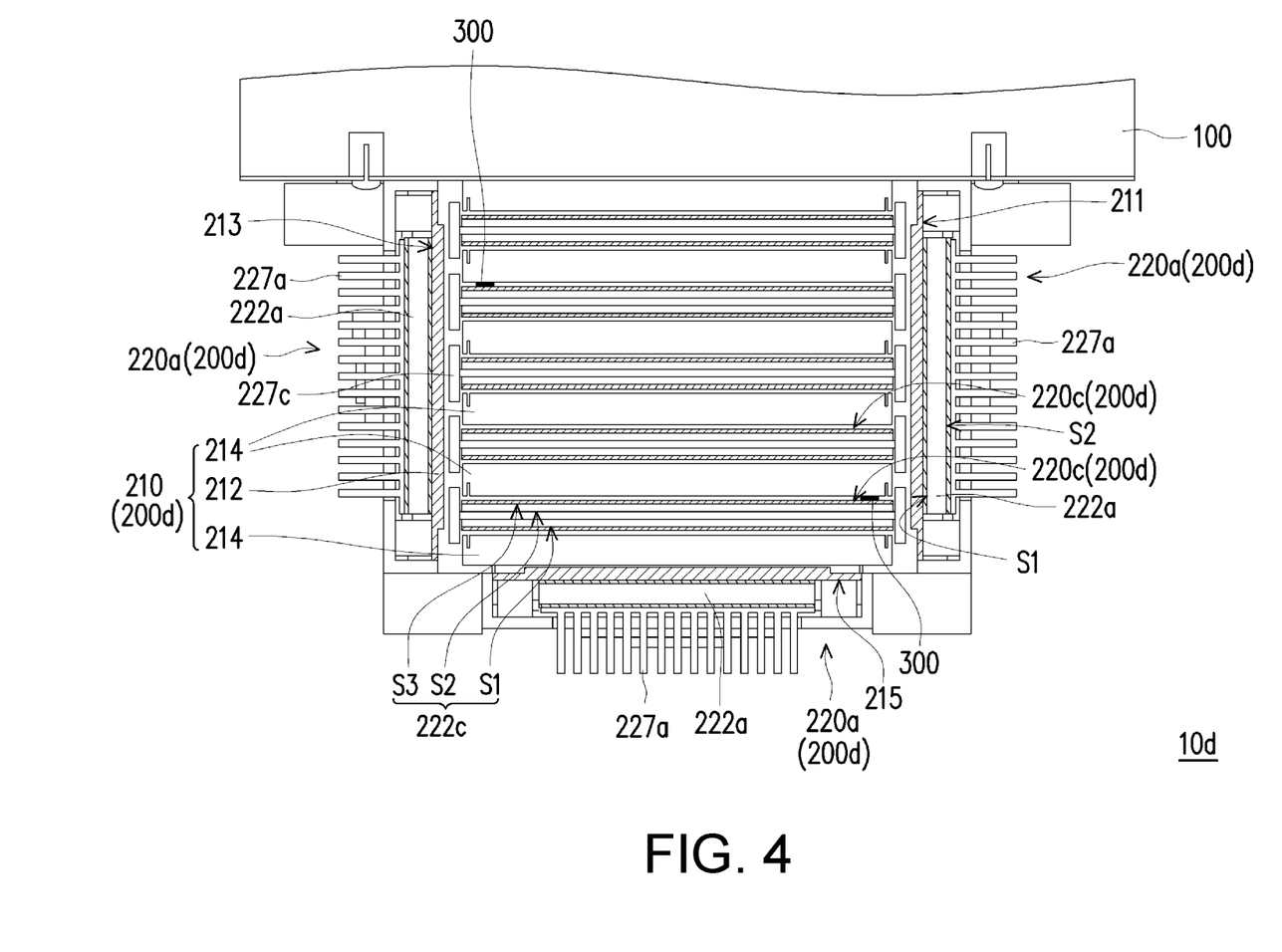
FIG. 4 is a partial cross-sectional view of a vehicle according to another embodiment of the invention.

FIG. 4 is a partial cross-sectional view of a vehicle according to another embodiment of the invention. Referring to FIG. 3A and FIG. 4, the vehicle 10d of the embodiment is similar to the vehicle 10c of FIG. 3A, and a difference there between is that the cell device 200d of the embodiment further includes the temperature adjusting modules 220a (the external temperature adjusting modules) of FIG. 1C. Namely, the cell device 200d of the embodiment simultaneously includes the external temperature adjusting modules (i.e. the temperature adjusting modules 220a) and the embedded temperature adjusting modules (i.e. the temperature adjusting modules 220c).

To be specific, the temperature adjusting modules 220a are disposed on the side surfaces 211, 213 and 215 of the cell module 210, and the temperature adjusting modules 220c are located in the casing 212 of the cell module 210 and located between the lithium batteries 214. When the temperature of the cell module 210 sensed by the temperature sensors 300 is lower than the first temperature value, the thermoelectric cooling chips 222a and 222c receive the first electric signal to heat the first surfaces S1 and the third surfaces S3 and cool the second surfaces S2. When the temperature of the cell module 210 sensed by the temperature sensors 300 is higher than the second temperature value, the thermoelectric cooling chips 222a and 222c receive the second electric signal to cool the first surfaces S1 and the third surfaces S3 and heat the second surfaces S2. Herein, the first temperature value is smaller than the second temperature value. Namely, when the temperature of the cell module 210 is lower than the predetermined value, the thermoelectric cooling chips 222a and 222c receive the first electric signal to heat the first surfaces S1 and the third surfaces S3 to present the warm surfaces and cool the second surfaces S2 to present the cool surfaces, so as to heat the cell module 210. On the other hand, when the temperature of the cell module 210 is higher than the predetermined value, the thermoelectric cooling chips 222a and 222c receive the second electric signal to cool the first surfaces S1 and the third surfaces S3 to present the cool surfaces and heat the second surfaces S2 to present the warm surfaces, and the cell module 210 is cooled through the cooling fins 227a and 227c.

In summary, the embodiment of the invention has at least one of following advantages or effects. In the design of the cell device of the invention, the thermoelectric cooling chip of the temperature adjusting module may receive different electric signals to simultaneously activate the cooling and heating effect. In this way, the cell device of the invention may be charged and discharged under a relatively stable temperature environment, so as to increase a service life thereof. Moreover, the temperature adjusting modules are configured to the cell module in the heat conduction manner, which may be external temperature adjusting modules or embedded temperature adjusting modules, and have advantages of simple structure, lightweight and high stability, and the thermoelectric cooling chip thereof has high-precision and high-reaction control, and may achieve high cooling efficiency and precise temperature control through a simple direct current power supply. Moreover, the vehicle adopting the cell device of the invention may be used under all weather conditions.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A cell device, comprising:
a cell module; and
at least one temperature adjusting module, configured on the cell module in a heat conduction manner, and the at least one temperature adjusting module comprising a thermoelectric cooling chip having a first surface and a second surface opposite to each other, wherein the thermoelectric cooling chip is configured to receive a first electric signal to heat the first surface and cool the second surface, and the thermoelectric cooling chip is configured to receive a second electric signal to cool the first surface and heat the second surface;
the at least one temperature adjusting module further comprises a temperature control chip, a first heat conduction pad and a second heat conduction pad, wherein the temperature control chip is electrically connected to the thermoelectric cooling chip, and the first heat conduction pad and the second heat conduction pad are respectively disposed on two opposite surfaces of the temperature control chip, wherein the first heat conduction pad is connected to a side surface of the cell module in the heat conduction manner and is located between the side surface of the cell module and a surface of the thermoelctric cooling chip.

2. A cell device as claimed in claim 1, wherein the at least one temperature adjusting module further comprises:
an upper casing; and
a lower casing, assembled to the upper casing, wherein the temperature control chip, the thermoelectric cooling chip, the first heat conduction pad and the second heat conduction pad are located between the upper casing and the lower casing.

3. The cell device as claimed in claim 2, wherein the at least one temperature adjusting module further comprises:
a cooling fin, disposed on the upper casing.

4. The cell device as claimed in claim 3, wherein the at least one temperature adjusting module is disposed on at least one side surface of the cell module, and the thermoelectric cooling chip is located between the cell module and the cooling fin.

5. The cell device as claimed in claim 4, further comprising:
at least one heat conduction sheet, wherein the cell module comprises a casing and a plurality of lithium batteries, the plurality of lithium batteries is located in the casing, and the at least one heat conduction sheet is disposed in the casing and located between the plurality of lithium batteries.

6. The cell device as claimed in claim 5, wherein the at least one heat conduction sheet and the casing are formed integrally.

7. The cell device as claimed in claim 1, wherein the cell module comprises a casing and a plurality of lithium batteries, the plurality of lithium batteries is located in the casing, and the at least one temperature adjusting module is located between the plurality of lithium batteries, and the thermoelectric cooling chip has a third surface, the second surface is located between the first surface and the third surface, the thermoelectric cooling chip is configured to receive the first electric signal to heat the third surface, and the thermoelectric cooling chip is configured to receive the second electric signal to cool the third surface.

8. The cell device as claimed in claim 7, further comprising:
at least one cooling fin, disposed on at least one side surface of the cell module.

9. The cell device as claimed in claim 1, wherein the at least one temperature adjusting module comprises at least one embedded temperature adjusting module and at least one external temperature adjusting module, the cell module comprises a casing and a plurality of lithium batteries, the plurality of lithium batteries is located in the casing, the at least one embedded temperature adjusting module is located between the plurality of lithium batteries, and the at least one external temperature adjusting module is disposed on at least one side surface of the cell module.

10. The cell device as claimed in claim 9, wherein the thermoelectric cooling chip of the at least one embedded temperature adjusting module has a third surface, the second surface is located between the first surface and the third surface, the thermoelectric cooling chip of the at least one embedded temperature adjusting module is configured to receive a first electric signal to heat the third surface, and the thermoelectric cooling chip of the at least one embedded temperature adjusting module is configured to receive a second electric signal to cool the third surface, and the at least one embedded temperature adjusting module comprises:
another temperature control chip, electrically connected to the thermoelectric cooling chip of the at least one embedded temperature adjusting module;
another first heat conduction pad, disposed on the first surface of the thermoelectric cooling chip of the at least one embedded temperature adjusting module; and
another second heat conduction pad, disposed on the third surface of the thermoelectric cooling chip of the at least one embedded temperature adjusting module.

11. The cell device as claimed in claim 9, wherein the at least one external temperature adjusting module comprises:
an upper casing;
a lower casing, assembled to the upper casing;
the temperature control chip, electrically connected to the thermoelectric cooling chip of the at least one external temperature adjusting module, and located between the upper casing and the lower casing;

the first heat conduction pad, disposed on the first surface of the thermoelectric cooling chip of the at least one external temperature adjusting module, and located between the upper casing and the lower casing;

the second heat conduction pad, disposed on the second surface of the thermoelectric cooling chip of the at least one external temperature adjusting module, and located between the upper casing and the lower casing; and a cooling fin, disposed on the upper casing, wherein the temperature control chip, the thermoelectric cooling chip of the at least one external temperature adjusting module, the first heat conduction pad and the second heat conduction pad are located between the upper casing and the lower casing.

12. The cell device as claimed in claim 1, wherein the first electric signal and the second electric signal are respectively a voltage.

13. The cell device as claimed in claim 1, wherein the first electric signal and the second electric signal are respectively a current.

14. A vehicle, comprising:

a body; and a cell device, fixed on the body, and comprising:

a cell module; and at least one temperature adjusting module, configured on the cell module in a heat conduction manner, the at least one temperature adjusting module comprising a thermoelectric cooling chip having a first surface and a second surface opposite to each other, wherein the thermoelectric cooling chip is configured to receive a first electric signal to heat the first surface and cool the second surface, and the thermoelectric cooling chip is configured to receive a second electric signal to cool the first surface and heat the second surface;

the at least one temperature adjusting module further comprises a temperature control chip, a first heat conduction pad and a second heat conduction pad, wherein the temperature control chip is electrically connected to the thermoelectric cooling chip, and the first heat conduction pad and the second heat conduction pad are respectively disposed on two opposite surfaces of the temperature control chip, wherein the first heat conduction pad is connected to a side surface of the cell module in the heat conduction manner and is located between the side surface of the cell module and a surface of the thermoelectric cooling chip.

15. The vehicle as claimed in claim 14, wherein the at least one temperature adjusting module of the cell device is electrically connected to the body.

16. The vehicle as claimed in claim 14, wherein the cell module supplies power to the at least one temperature adjusting module.

17. The vehicle as claimed in claim 14, wherein the cell module and the at least one temperature adjusting module of the cell device are fixed to the body through a locking manner.

18. The vehicle as claimed in claim 14, further comprising:

at least one temperature sensor, disposed on the cell module.

19. The vehicle as claimed in claim 18, wherein the first surface of the thermoelectric cooling chip is located between the cell module and the second surface, and when a temperature of the cell module sensed by the at least one temperature sensor is smaller than a first temperature value, the thermoelectric cooling chip receives the first electric signal to heat the first surface and cool the second surface, and when the temperature of the cell module sensed by the at least one temperature sensor is greater than a second temperature value, the thermoelectric cooling chip receives the second electric signal to cool the first surface and heat the second surface, and the first temperature value is smaller than the second temperature value.

20. The vehicle as claimed in claim 18, wherein the thermoelectric cooling chip has a third surface, the second surface is located between the first surface and the third surface, the thermoelectric cooling chip is configured to receive the first electric signal to heat the third surface, and the thermoelectric cooling chip is configured to receive the second electric signal to cool the third surface, and the first surface of the thermoelectric cooling chip is located between the cell module and the second surface, the third surface is located between the cell module and the second surface, and when a temperature of the cell module sensed by the at least one temperature sensor is smaller than a first temperature value, the thermoelectric cooling chip receives the first electric signal to heat the first surface and the third surface and cool the second surface, and when the temperature of the cell module sensed by the at least one temperature sensor is greater than a second temperature value, the thermoelectric cooling chip receives the second electric signal to cool the first surface and the third and heat the second surface, and the first temperature value is smaller than the second temperature value.

* * * * *